(12) United States Patent
Gooi et al.

(10) Patent No.: US 8,308,379 B2
(45) Date of Patent: Nov. 13, 2012

(54) THREE-POLE TILT CONTROL SYSTEM FOR CAMERA MODULE

(75) Inventors: Kwang Jin Gooi, Perak (MY); Tzer Nan Tan, Penang (MY); Kean Leong Tai, Penang (MY)

(73) Assignee: DigitalOptics Corporation, Charlotte, NC (US)

( * ) Notice: Subject to any disclaimer, the term of this patent is extended or adjusted under 35 U.S.C. 154(b) by 0 days.

(21) Appl. No.: 12/928,026

(22) Filed: Dec. 1, 2010

(65) Prior Publication Data

US 2012/0141114 A1 Jun. 7, 2012

(51) Int. Cl.
*G03B 17/00* (2006.01)
*G02B 7/02* (2006.01)

(52) U.S. Cl. .................. 396/529; 359/819; 359/823

(58) Field of Classification Search .................. 396/529; 348/340, 360, 373–376; 359/819, 822–823
See application file for complete search history.

(56) References Cited

U.S. PATENT DOCUMENTS

| | | | |
|---|---|---|---|
| 2004/0223072 A1* | 11/2004 | Maeda et al. | 348/340 |
| 2007/0160370 A1* | 7/2007 | Kikuchi et al. | 396/529 |
| 2009/0160998 A1* | 6/2009 | Fukamachi et al. | 348/340 |
| 2009/0324213 A1* | 12/2009 | Wang | 396/529 |

* cited by examiner

*Primary Examiner* — W. B. Perkey
*Assistant Examiner* — Minh Phan
(74) *Attorney, Agent, or Firm* — Larry E. Henneman, Jr.; Henneman & Associates, PLC

(57) ABSTRACT

A novel camera module includes a housing having a lens unit receiving portion and an image capture device receiving portion, which includes a plurality of discrete support members. A lens unit is coupled to the lens unit receiving portion of the housing. An image capture device has a top surface, which includes an image sensor array. The top surface of the image capture device contacts the bottom of the discrete support members of the housing to align the tilt of the image capture device with respect to the housing. In a particular embodiment, the image capture device is mounted on a surface of a circuit substrate that is coupled to the housing. In an alternate embodiment, the housing is coupled directly to the image capture device.

21 Claims, 7 Drawing Sheets

THREE-POLE TILT CONTROL SYSTEM FOR CAMERA MODULE

BACKGROUND OF THE INVENTION

1. Field of the Invention

The present invention relates generally to electronic devices, and more particularly to digital camera modules. Even more particularly, the present invention relates to a system for controlling the optical alignment of a lens assembly with respect an image capture device.

2. Description of the Background Art

Digital camera modules are currently being incorporated into a variety of electronic devices. Such camera hosting devices include, but are not limited to, cellular telephones, personal data assistants (PDAs), and computers. The demand for digital camera modules continues to grow as the ability to incorporate the camera modules into host devices expands. Therefore, one design goal of digital camera modules is to make them as small as possible so that they will fit into an electronic device without substantially increasing the overall size of the device. Means for achieving this goal must, of course, preserve the quality of images captured by the camera modules.

A conventional digital camera module generally includes an image capture device (ICD), a printed circuit substrate (PCB), a housing, and a lens unit. Typically, the components are formed separately and later assembled to create the digital camera module. The assembly typically involves first mounting the ICD on the top surface of the PCB by some suitable adhesive such as, for example, an epoxy. Then, a set of electrical contacts of the ICD are connected to a complementary set of contacts of the PCB by some suitable means (e.g., conductive past, wire bonds, stud bumps, etc.). After the ICD is mounted and electrically connected to the PCB, the housing is mounted on the PCB over the ICD so that the ICD is enclosed within the bottom of the housing. The housing is typically fixed to the PCB via an adhesive such as, for example, epoxy. Once the housing is mounted on the PCB, the lens unit is mounted to the opposite end of the housing to focus incident light onto an image sensor array of the ICD. Typically, the lens unit includes a lens fixed within a lens assembly. The exterior surface of the lens assembly typically defines some type of sloped surface (e.g., threads, cam, ramps, etc.) that engages a complementary sloped surface formed on the housing such that proper focusing can be achieved by rotating the lens unit within the housing. After the lens assembly is properly displaced with respect to the image sensor array, the lens unit is fixed (e.g., via adhesive, thermal weld, etc.) with respect to the housing.

In small digital camera modules, specific details vary depending on the particular design. However, one commonality is that it is critical for the optical axis of the lens assembly to be accurately aligned with respect to the image sensor array. Failing to do so likely results in poor image capture such as, for example, blurred images. Ideally, the lenses should all be coaxially perpendicular to the center of the planar image sensor array. In reality, however, completely eliminating optical tilt in small camera modules is highly unlikely and, therefore, typically only achieved within a predetermined tolerance. Optical tilt commonly refers to the angular error at which the optical axis of the lens assembly deviates from being perpendicular to the image sensor array.

In manufacturing conventional camera modules, several challenges are encountered by manufacturers. For example, to minimize optical tilt in small camera modules several parameters must be controlled during the fabrication and assembly of the camera module components. Such parameters include: planarity and tilt of the top surface of the ICD, planarity and tilt of the bottom surface of the ICD, planarity and tilt of the top surface of the circuit substrate, evenness of the epoxy between the ICD and the top surface of the circuit substrate, planarity and tilt of the bottom surface of the housing, evenness of the epoxy between the top surface of the circuit substrate and the bottom surface of the housing, and tilt of the lens assembly with respect to the housing. Of course, to control such a high number of parameters, camera module manufacturers must implement a high number of delicate and, therefore, expensive processes. Not only does this high number of parameters complicate the overall manufacturing process, but also limits the overall quality of the camera module. Indeed, the overall optical tilt tolerance becomes increasingly more difficult to satisfy as the number of parameters that need to be controlled increases. This is because the overall optical tilt tolerance is defined by an accumulation, or "tolerance stack", of the parameter tolerances. Even if parameter errors are minimized to the manufacturing limit, they accumulate into a significant overall error because such a high number of parameters have to be controlled. Thus, significant optical tilt and, therefore, poor image quality is oftentimes inevitable in conventional camera modules. This particularly frustrates the further development of such camera modules because, even when minimized, the optical tilt is typically too severe to satisfy the needs of more complex lens systems (e.g., extended depth of field lens systems) and high resolution image capture devices.

What is needed, therefore, is a camera module design that simplifies the optical alignment process. What is also needed is a camera module that can be optically aligned with a higher degree of accuracy. What is also needed is a camera module that can be assembled with more forgiving tolerances. What is also needed is a camera module design that reduces the number of tolerance requirements. What is also needed is a camera module that is less expensive to manufacture.

SUMMARY

The present invention overcomes the problems associated with the prior art by providing a camera module and a method for manufacturing the camera module that reduces optical tilt, has relaxed geometric and assembly tolerances of components, and requires relatively fewer manufacturing steps. The invention facilitates the accurate positioning of a lens assembly with respect to an image sensor array.

In one embodiment, the camera module includes a housing having a lens unit receiving portion and an image capture device receiving portion. A lens unit is coupled to the lens unit receiving portion of the housing, and an image capture device is coupled to the image capture receiving portion of the housing. The image capture device has a top surface, which includes a sensor array, and a bottom surface. The image capture device receiving portion of the housing includes a plurality (e.g., three) of discrete support members, each contacting the top surface of the image capture device, thereby controlling the tilt of the image capture device with respect to the housing. In an example embodiment, bottom surfaces of the support members directly abut the top surface of the image capture device. Optionally, the support members are an integral part of the housing and, in an example embodiment, are poles extending perpendicularly with respect to the image sensor array.

According to one particular embodiment, the image capture device receiving portion of the housing further includes a side wall, which has a bottom surface. The camera module further includes a circuit substrate having a top surface, upon which the image capture device is mounted. A gap separates the bottom surface of the sidewall of the housing from the top surface of the circuit substrate, and an adhesive is disposed in the gap to fix the housing to the circuit substrate. The bottom surfaces of the support members abut the top surface of the image capture device, thereby causing the gap between the housing and the circuit substrate. In an example embodiment, there are three discrete support members. Optionally, the support members are an integral part of the housing. As another option, the camera module can include a focus feature for adjusting the position of the lens unit with respect to the image capture device.

In an alternate embodiment, the housing is mounted on the image capture device. A gap separates the bottom surface of the sidewall of the housing from the top surface of the image capture device. An adhesive is positioned in the gap to fix the bottom surface of the sidewall of the housing to the top surface of the image capture device.

In yet another alternate embodiment, the camera module includes a circuit substrate, and the housing and the image capture device are mounted on opposite sides of the circuit substrate. The support members extend through an aperture formed in the circuit substrate and contact the top surface of the surface substrate.

Optionally, the camera module further includes a light permissive substrate that is mounted in the image capture device receiving portion of the housing. The image capture device receiving portion of the housing includes an inner surface that defines a light permissive substrate retaining feature. The support members can also function as at least part of the retaining feature.

The example camera module further includes a focus feature for adjusting the position of the lens unit with respect to the image capture device. By way of example, the focus feature includes a first set of threads formed on the lens unit receiving portion of the housing and a complementary second set threads formed on the lens unit.

Methods for manufacturing camera modules are also disclosed. One method includes providing an image capture device having a bottom surface and a top surface, providing a lens unit, providing a housing having a lens unit receiving portion and an image capture device receiving portion that includes a plurality of discrete support members each having a lower portion, bringing the lower portions of the discrete support members into contact with the top surface of the image capture device, and coupling the lens unit to the lens unit receiving portion of the housing.

According to one example method, the image capture device receiving portion of the housing further includes a side wall, which has a bottom surface. A more particular method further includes providing a circuit substrate having a top surface, mounting the image capture device on the top surface of the circuit substrate, and electrically coupling the image capture device to the circuit substrate. A gap separates the bottom surface of the sidewall of the housing from the top surface of the circuit substrate when the housing is positioned on the image capture device. The method further includes providing an adhesive, disposing the adhesive between the bottom surface of the sidewall and the top surface of the circuit substrate, and maintaining contact between the support members and the top surface of the circuit substrate while the adhesive cures. Optionally, the support members are an integral part of the housing. As yet another option, there are exactly three discrete support members. As yet another option, the camera module further includes a focus feature for adjusting the position of the lens unit with respect to the image capture device.

In another particular method, a gap separates the bottom surface of the sidewall of the housing from the top surface of the image capture device. The method further includes providing an adhesive, disposing the adhesive in the gap separating the bottom surface of the sidewall of the housing from the top surface of the image capture device, and maintaining contact between the support members and the image capture device which the adhesive cures.

Another example method further includes providing a circuit substrate having a top surface, mounting the image capture device on the top surface of the circuit substrate, and electrically coupling the image capture device to the circuit substrate.

Optionally, an example method further includes providing a light permissive substrate and mounting the light permissive substrate in the image capture device receiving portion of the housing. The image capture device receiving portion of the housing includes an inner surface that defines a light permissive substrate retaining feature. The support members can also function as at least part of the retaining feature.

Optionally, the support members are an integral part of the housing. As another option, the support members include three discrete support members. As yet another option, the support members are poles extending perpendicularly with respect to the image sensor array.

All of the disclosed example embodiments include structure that provides a means for controlling tilt between the image capture device and the lens unit.

A method of aligning tilt between a lens and an image capture device includes providing a lens unit including the lens, providing the image capture device with a top surface having an image sensor array, and providing a structure for coupling the lens unit and said image capture device. The structure includes three raised contact points, which define an alignment plane. The method further includes bringing the top surface of the image capture device into contact with the three raised contact points and fixing the image capture device with respect to the structure.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a camera module that includes a housing supported and/or positioned directly on an ICD via a plurality of discrete support members. In the following description, numerous specific details are set forth (e.g., electrical bonding processes and elements, circuit substrate types, circuitry configurations, adhesive types, lenses, optical filters, etc.) in order to provide a thorough understanding of the invention. Those skilled in the art will recognize, however, that the invention may be practiced apart from these specific details. In other instances, details of well known camera module manufacturing practices (e.g., automated focus processes, materials selection, molding processes, etc.) and components (e.g., electronic circuitry, device interfaces, etc.) have been omitted, so as not to unnecessarily obscure the present invention.

Figure 1:
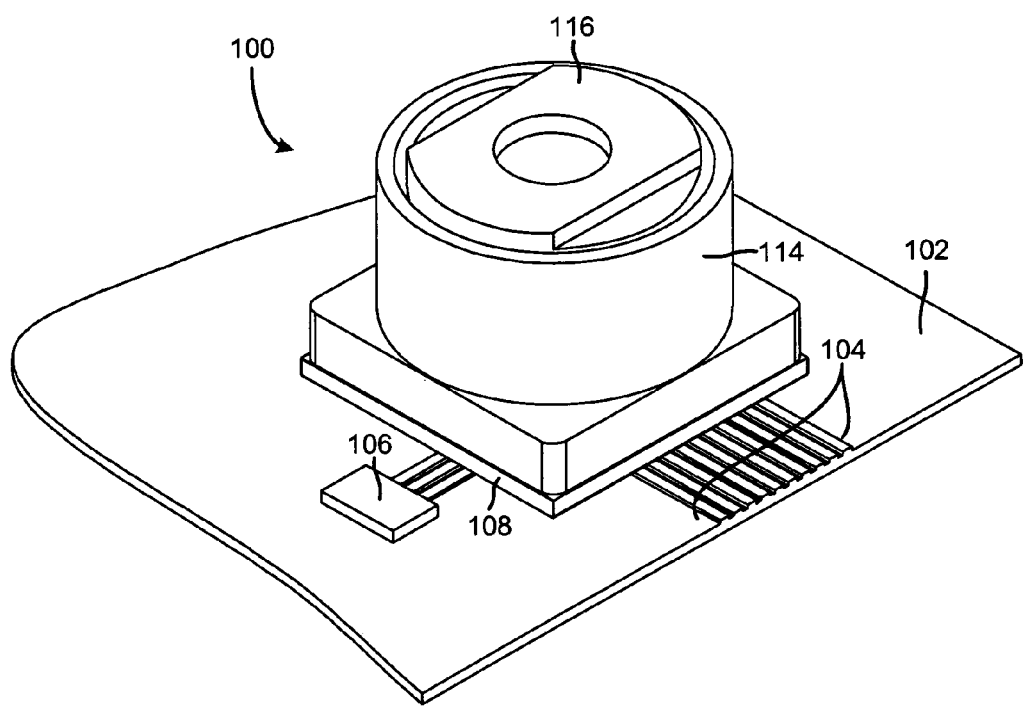
FIG. 1 is a perspective view of a camera module according to one embodiment of the present invention.

FIG. 1 is a perspective view of a camera module 100 according to one embodiment of the present invention. Camera module 100 is shown mounted on a portion of a printed circuit board (PCB) 102 that represents a PCB of a camera hosting device. Camera module 100 communicates electronically with other components of the hosting device via a plurality of conductive traces 104. Device 106 represents an electronic component (e.g., passive device, etc.) that may be mounted directly on PCB 102. Those skilled in the art will recognize that the particular design of PCB 102 will depend on the particular application, and is not particularly relevant to the present invention. Therefore, PCB 102, traces 104, and device 106 are representational in character only.

Camera module 100 includes a circuit substrate 108, an image capture device 110 (not visible in view of FIG. 1), an infrared (IR) filter 112 (also not visible in view of FIG. 1), a housing 114, and a lens unit 116. Circuit substrate 108 (e.g., rigid PCB, flexible PCB, ceramic chip carrier, etc.) is mounted to one end (e.g., the bottom) of housing 114 and lens unit 116 is mounted to the other end (e.g., the top) of housing 114. ICD 110 (shown in FIG. 2) is mounted on the top surface of circuit substrate 108, between circuit substrate 108 and housing 114. IR filter 112 (shown in FIG. 2) is mounted within housing 114 between ICD 110 and lens unit 116.

Figure 2:
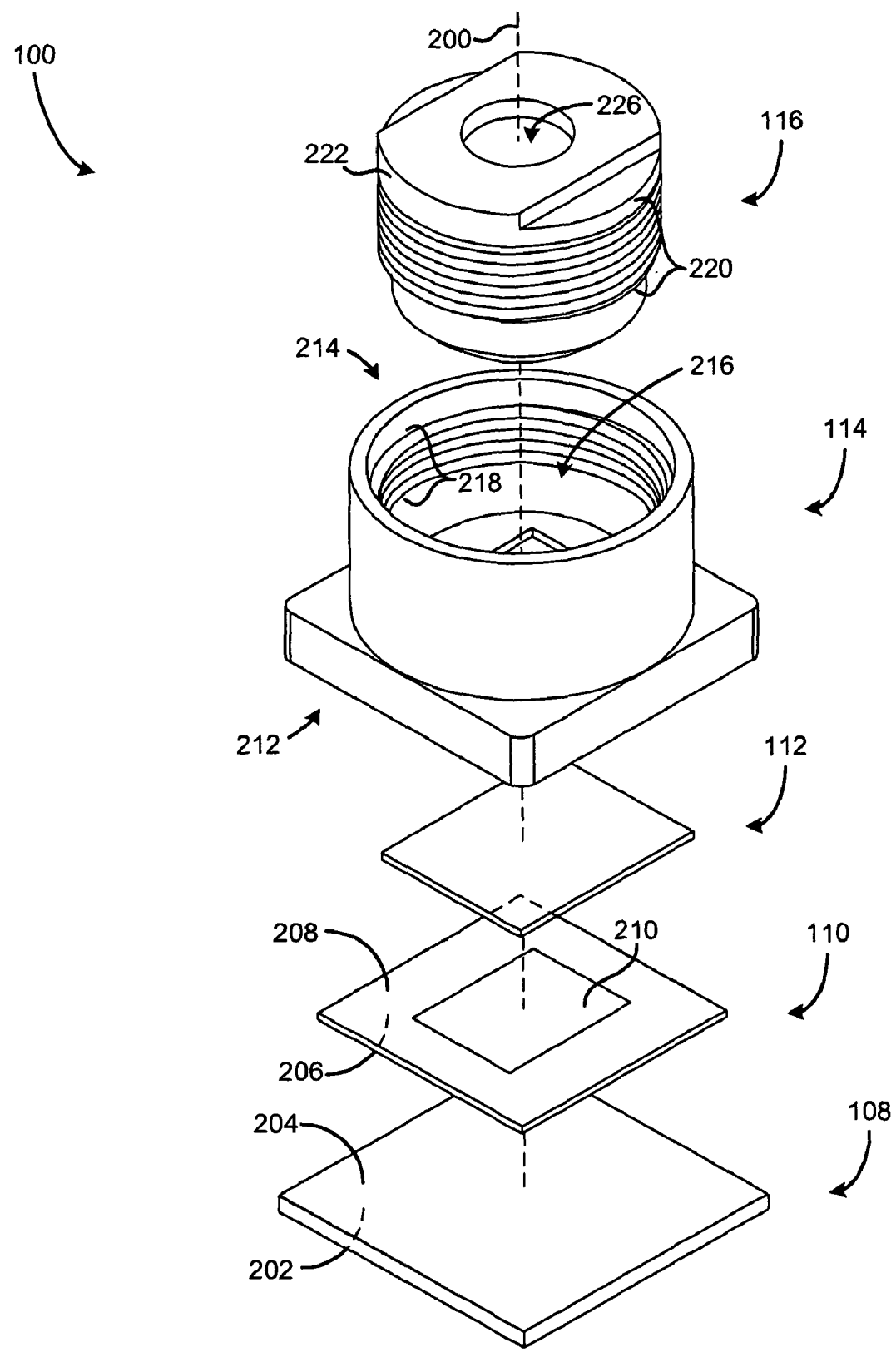
FIG. 2 is a perspective view of the camera module of FIG. 1 exploded along an axis 200.

FIG. 2 is a perspective exploded view of camera module 100 showing details not visible in the view of FIG. 1. As shown, the components of camera module 100 are coaxially aligned along an optical axis 200.

Circuit substrate 108 includes a bottom surface 202 and a top surface 204. Bottom surface 202 is a flat planar surface whereon a set of electrical contacts (not shown) are formed to facilitate the electrical connection between camera module 100 and a host device. Top surface 204 is also a flat planar surface whereon a set of contacts (not shown) are formed to facilitate the electrical connection between circuit substrate 108 and ICD 110.

ICD 110 includes a bottom surface 206 and a top surface 208. Bottom surface 206 is a flat planar surface whereon a set of contacts (not shown) are formed to facilitate the electrical connection with the contacts formed on top surface 204 of circuit substrate 108. Optionally, the electrical contacts can be formed on top surface 208 of ICD 110 and connected to the electrical contacts of circuit substrate 108 by alternate means (e.g., wire bonding). Top surface 208 is also a flat planar surface having an image sensor array 210 whereon images are focused and converted into electrical data that is processed by the processing circuitry of ICD 110 and/or the host device. ICD 110 can be fixed to circuit substrate 108 by any suitable means known to those skilled in the art (e.g., adhesive, conductive paste, etc.).

IR filter 112 is mounted within housing 114 over image sensor array 210 so as to filter out infra-red light from the light focused onto image sensor array 210 by lens unit 116. IR filter 112 also functions as a means to protect image sensor array 210 from any small particulate debris (e.g., dust) that could otherwise accumulate thereon and degrade the quality of images captured by camera module 100. IR filter 112 is not a critical element of camera module 100 and can, therefore, be eliminated, altered, and/or substituted for without deviating from the main scope of the present invention. For example, IR filter 112 could be replaced by an alternative light permissive substrate (e.g., glass) that has no light filtering properties but functions solely as a means for protecting image sensor array 210 from debris (e.g., dust).

Housing 114 includes an image capture device receiving portion 212 and a lens unit receiving portion 214. ICD receiver portion 212 is adapted to be mounted to top surface 204 of circuit substrate 108 so as to enclose ICD 110 within circuit substrate 108 and housing 114. Lens unit receiver portion 214 includes an opening 216 that receives and centers lens unit 116 with respect to image sensor array 210. Opening 216 includes a set of threads 218 formed to engage a complementary set of threads 220 formed on lens unit 116, to facilitate the focusing of camera module 100. In particular, rotating lens unit 116 in a clockwise direction raises lens unit 116 with respect to housing 114, thereby increasing the distance between lens unit 116 and image sensor array 210. Conversely, rotating lens unit 116 in a counter-clockwise direction lowers lens unit 116 with respect to housing 114, thereby decreasing the distance between lens unit 116 and image sensor array 210. Thus, an image focused by lens unit 116 can be properly adjusted to lie in the focal plane of image sensor array 210.

Lens unit 116 further includes a lens housing 222 and a lens assembly 224 (visible in the view of FIG. 4) fixably mounted therein. Indeed, the rotation of lens housing 222 causes lens assembly 224 to move along axis 200. Lens housing 222 also defines an optical aperture 226 coaxially aligned with optical axis 200.

Figure 3:
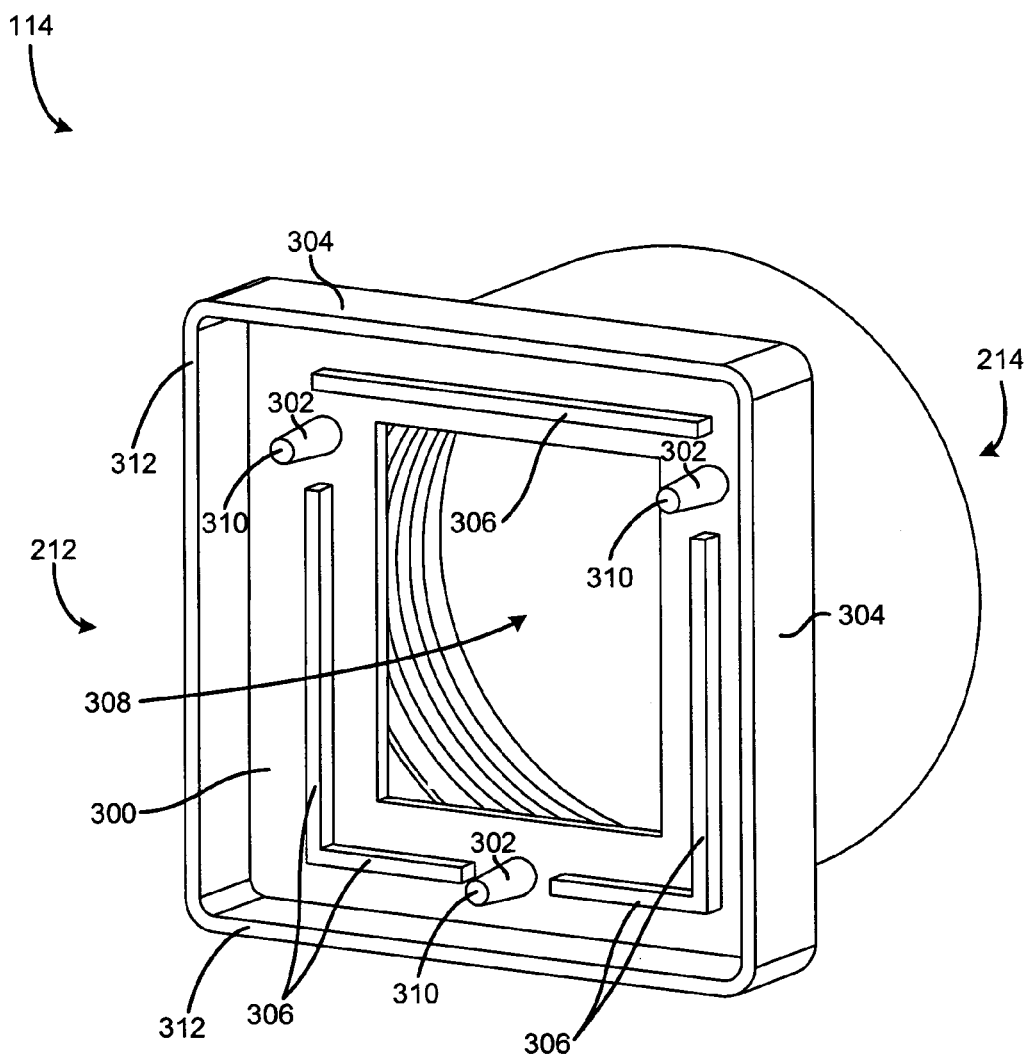
FIG. 3 is a bottom perspective view of the camera housing of FIG. 2.

FIG. 3 is a bottom perspective view of housing 114 showing details of ICD receiving portion 212 not visible in the view of FIGS. 1 and 2. ICD receiving portion 212 includes an upper wall 300, a plurality of support members 302, a sidewall 304, and a plurality of retaining features 306. Upper wall 300 defines an opening 308 that provides an optical path from the lens assembly to image sensor array 210. Support members 302 are protrusions (raised contact points) that extend downward from upper wall 300 in directions substantially parallel to optical axis 200. Each of support members 302 include a bottom portion 310 adapted to abut top surface 208 of ICD 110. Together, the portions 310 define a an ICD alignment plane perpendicular to axis 200 of FIG. 2. Sidewall 304 extends downward from upper wall 300 and includes a flat planar bottom surface 312 that couples to top surface 204 of circuit substrate 108 (although in a spaced apart relationship) during the assembly of camera module 100. Retaining features 306 facilitate the alignment and retention of IR filter 112 with respect to opening 308. As shown, features 306 extend downward from upper wall 300 so as to define a perimeter wherein IR filter 112 is seated and mounted during assembly.

Figure 4:
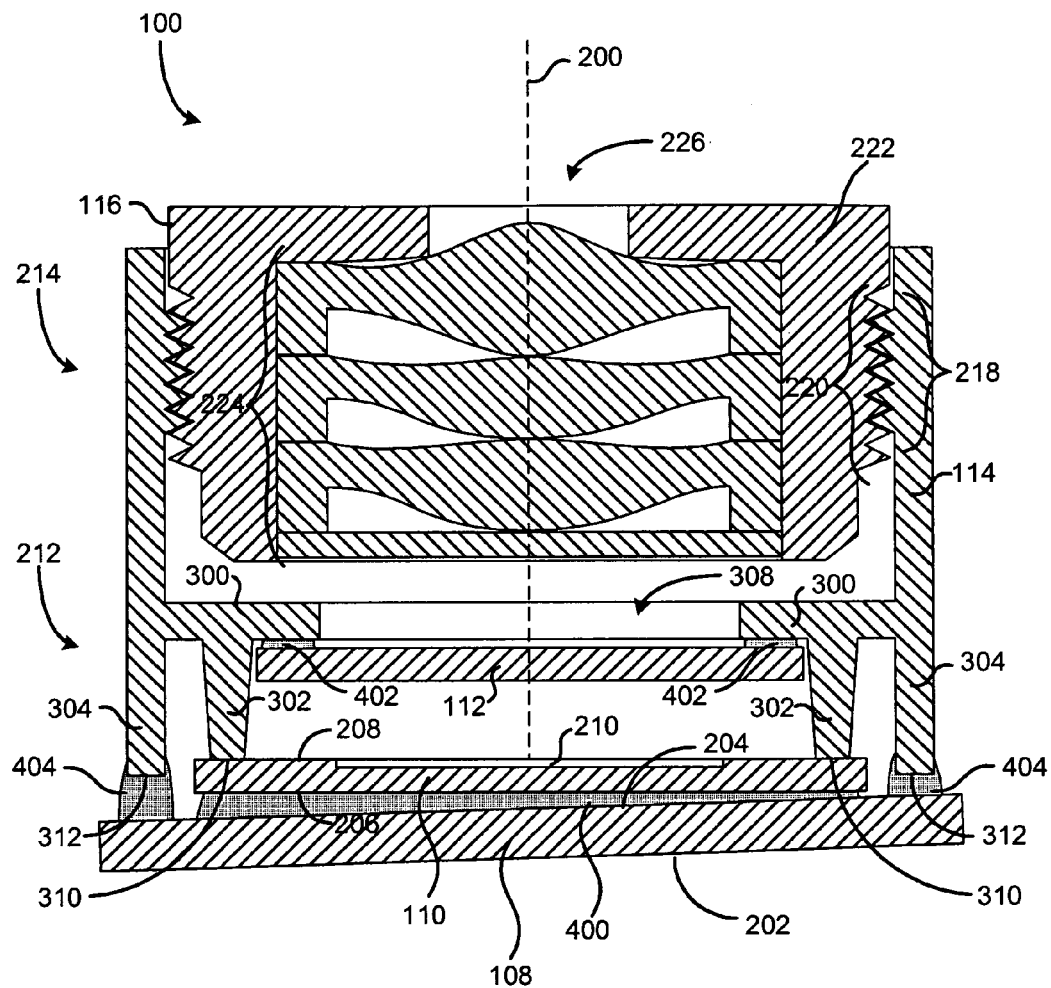
FIG. 4 is a cross sectional view of the camera module of FIG. 1.

FIG. 4 is a cross-sectional view of assembled camera module 100. As shown, ICD 110 is mounted and electrically connected to circuit substrate 108, IR filter 112 is mounted to housing 114, housing 114 is mounted to circuit substrate 108, and lens unit 116 is mounted in the opening of housing 114.

ICD 110 is mounted on circuit substrate 108 in a fixed position via an adhesive 400. More specifically, adhesive 400 forms a direct bond between bottom surface 206 of ICD 110 and top surface 204 of circuit substrate 108. Although various types of adhesives can be used to bond ICD 110 to circuit substrate 108, the inventors have achieved good results using epoxy. ICD 110 is electrically connected to the circuitry of circuit substrate 108 by some suitable means such as, for example, wire bonding, stud bumping, conductive paste, etc.

One problem addressed by the present invention is the non-uniform thickness of adhesives used to fix ICDs to circuit substrates. To illustrate how this problem is solved by the present invention, the thickness of adhesive 400 is shown to vary from one side of ICD 110 to the other. The variation in thickness of adhesive 400 is greatly exaggerated in FIG. 4 to provide a clearer explanation of the invention.

IR filter 112 is seated within retaining features 306 (visible in FIG. 3) and fixed directly to upper wall 300 via an adhesive 402. As shown, adhesive 402 is disposed around opening 308 between upper wall 300 and the peripheral top surface of IR filter 112. Not only does adhesive 402 facilitate the bonding of IR filter 112, but also forms a seal that prevents particulate debris (e.g., dust, frictional wear particulates, etc.) from entering into ICD receiving portion 212 through opening 308.

Housing 114 is positioned directly on ICD 110 and secured to circuit substrate 108 in a fixed position via an adhesive 404. Housing 114 is positioned on ICD 110 such that bottom portions 310 of support members 302 directly abut top surface 208 of ICD 110. It is important to understand that when housing 114 is positioned on ICD 110, sidewall 304 is suspended above circuit substrate 108 such that bottom surface 312 of sidewall 304 does not directly contact top surface 204 circuit substrate 108. Adhesive 404 is disposed between bottom surface 312 and top surface 204 so as to form a bond sufficient to fix housing 114 with respect to circuit substrate 108. Further, adhesive 404 also forms a closed seal by bridging the gap between top surface 204 and the entire bottom surface 312.

Because the bottom portions 310 of support members directly 302 directly abut top surface 208 of ICD 110, the tilt between ICD 110 and lens unit 116 is minimized, not withstanding the obvious tilt between ICD 110 and circuit substrate 108 or between circuit substrate 108 and housing 114. Thus, any tilt caused by the non-uniform adhesive layer 400 is eliminated.

With reference to FIG. 4, an example process for assembling camera module 100 is summarized as follows. Adhesive 400 is applied to bottom surface 206 of ICD 110 and/or top surface 204 of circuit substrate 108. While adhesive 400 is still viscous, ICD 110 is positioned directly on circuit substrate 108 such that adhesive 400 is sandwiched therebetween. Once ICD 110 is correctly positioned on circuit substrate 108, adhesive 400 sets and forms a rigid bond. Depending on the method used to electrically connect ICD 110 to the circuitry of circuit substrate 108, the electrical connection can be made before, during, or after adhesive 400 sets. Adhesive 402 is applied around the peripheral area of top surface of IR filter 112 and/or around opening 308 on the bottom surface of upper wall 300. IR filter 112 is then seated within retaining features 306 (not shown in FIG. 4) so that adhesive 402 permanently bonds IR filter 112 to the bottom surface of upper wall 300. Then, lens unit 222 is threaded into opening 216 of housing 114. Next, adhesive 404 is applied on top surface 204 of circuit substrate 108 and/or on bottom surface 312 of sidewall 304. While adhesive 404 is still viscous, bottom portions 310 of support members 302 are positioned directly on top surface 208 of ICD 110 such that bottom surface 312 of side wall 304 is suspended above and, therefore, free of direct contact with top surface 208 of ICD 110. While adhesive 404 is still viscous, housing 114 remains supported solely on ICD 110 in a position wherein optical axis 200 is perpendicularly centered with respect to image sensor array 210. Adhesive 404 is then cured, thereby forming a rigid bond between housing 114 and circuit substrate 108. Then, final focal adjustments are made by rotating lens unit 116 until proper focusing achieved. Once focused, lens unit 116 is fixed with respect to housing 114 by some suitable means such as, for example, adhesive, thermal weld, etc.

It should be understood that the design of camera module 100 alleviates several problems associated with conventional camera module designs. For example, achieving proper optical alignment in camera module 100 is much simpler than doing so in conventional camera modules. This is because the optical alignment of camera module 100 depends on controlling far fewer parameters than does the optical alignment of conventional camera modules. In conventional camera modules, the accuracy at which optical alignment can be achieved depends on several parameters including: the flatness of the top surface of the ICD, the flatness of the bottom surface of the ICD, how parallel the top and bottom surfaces of the ICD are to one another, how accurately the ICD is bonded to the circuit substrate, how flat the circuit substrate is, how flat the bottom surface of the housing is, how accurately the bottom surface of housing is bonded to the top surface of the circuit substrate, etc. In contrast, the accuracy at which optical alignment can be achieved in camera module 100 depends on far fewer parameters including only the flatness of top surface 208 and how precisely support members 302 can be formed. The substantial reduction in parameters results from housing 114 directly contacting ICD 110 rather than circuit substrate 108. In other words, sidewall 304 provides no support before adhesive 404 cures and, therefore, cannot affect the position of housing 114 with respect to circuit substrate 108. Before adhesive 404 solidifies, it serves only to bridge the separation between bottom surface 312 of sidewall 304 and top surface 204 of circuit substrate 108. Thus, the optical alignment of camera module 100 is relatively unaffected by the accuracy at which ICD 110 and/or housing 114 is positioned with respect to circuit substrate 108. Once adhesive 404 solidifies, however, it forms both a closed seal and a permanent rigid bond between housing 114 and circuit substrate 108.

Figure 5:
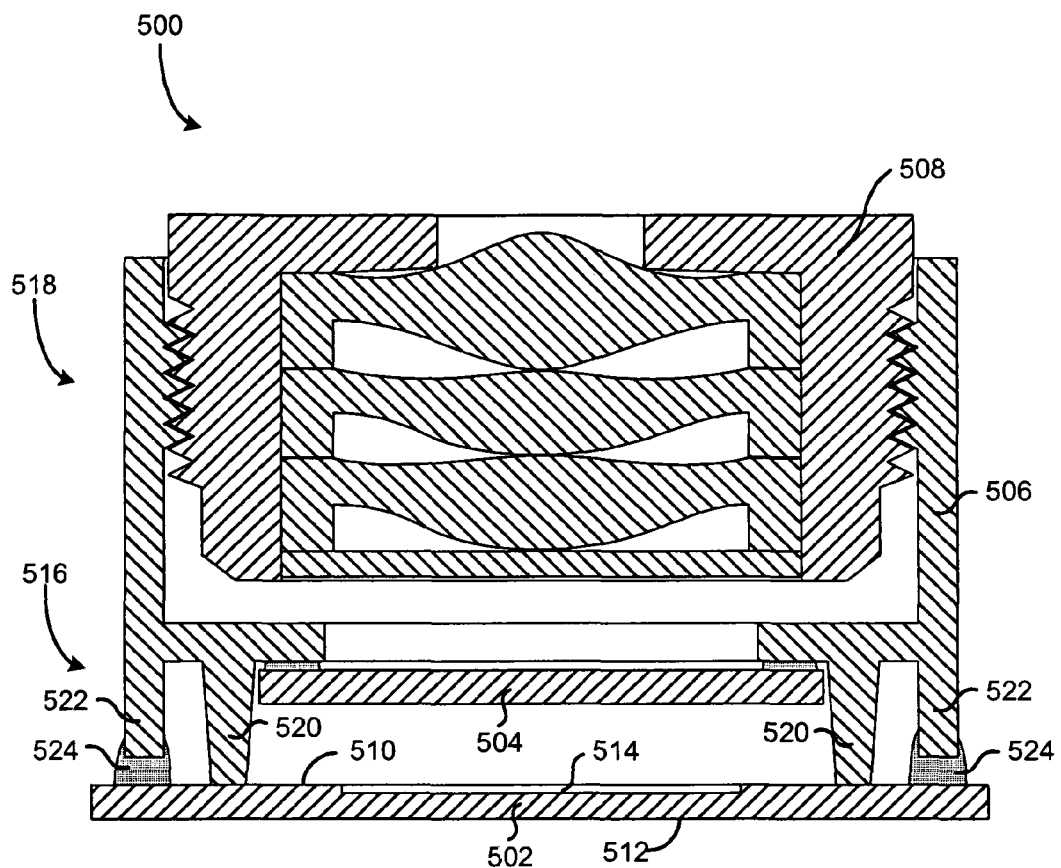
FIG. 5 is a cross sectional view of an alternate camera module according to another embodiment of the present invention.

FIG. 5 is a cross-sectional side view of a camera module 500, according to another aspect of the present invention. Camera module 500 includes an alternate ICD 502, an IR filter 504, an alternate housing 506, and a lens unit 508. Apart from the slight differences described below, the components of camera module 500 are substantially similar to the respective components of camera module 100.

In the present embodiment, camera module 500 differs from camera module 100 in that camera module 500 does not include a circuit substrate. Instead, housing 506 is supported on and attached directly to ICD 502.

ICD 502 includes a top surface 510 and a bottom surface 512. Top surface 510 includes an image an image sensor array 514 formed thereon. ICD 502 is substantially similar to ICD 110, yet differs slightly in that top surface 510 defines a larger area than that of top surface 208 of ICD 110. This enables top surface 510 of ICD 502 to span the entire footprint area of housing 506. Although not shown, ICD 502 includes a set of electrical contacts for electrically connecting camera module 500 to a circuit substrate (e.g., host device circuit board, flexible PCB, rigid PCB, ceramic chip carrier, etc.). The electrical contacts can be formed on bottom surface 512 so that camera module 500 can be mounted on a top surface of a circuit substrate. Optionally, the contacts can be formed on the top surface 510, outside of housing 506, to accommodate different mounting methods. For example, camera module 500 could be flip-chip mounted to a circuit substrate having an opening passing therethrough. Of course, top surface 510 would have to extend far enough beyond the footprint area of the housing to provide enough room for the contacts.

Housing 506 includes an image capture device receiving portion 516 and a lens unit receiving portion 518. ICD receiving portion 516 includes a set of three support members 520 and a sidewall 522 that are similar to support members 302 and sidewall 304 of ICD receiving portion 212, respectively. One difference, however, is that the relative heights of support members 520 and sidewall 522 are such that when support members 520 abut top surface 510 of ICD 502, sidewall 522 is suspended above top surface 510 of ICD 502. This results in a gap between sidewall 522 and ICD 502 that makes the overall optical alignment of camera module 500 unaffected by the coupling of sidewall 522 to ICD 502. As shown, the gap is bridged via an adhesive 524 that, when cured, forms a seal and prevents relative movement between ICD 502 and housing 506.

For illustrative purposes, IR filter 504, lens unit 508, and lens unit receiving portion 518 are substantially similar to IR filter 112, lens unit 116, and lens unit receiving portion 214, respectively. Therefore, a detailed description of IR filter 504, lens unit 508, and lens unit receiving portion 518 is not provided, so as to avoid redundancy.

Figure 6:
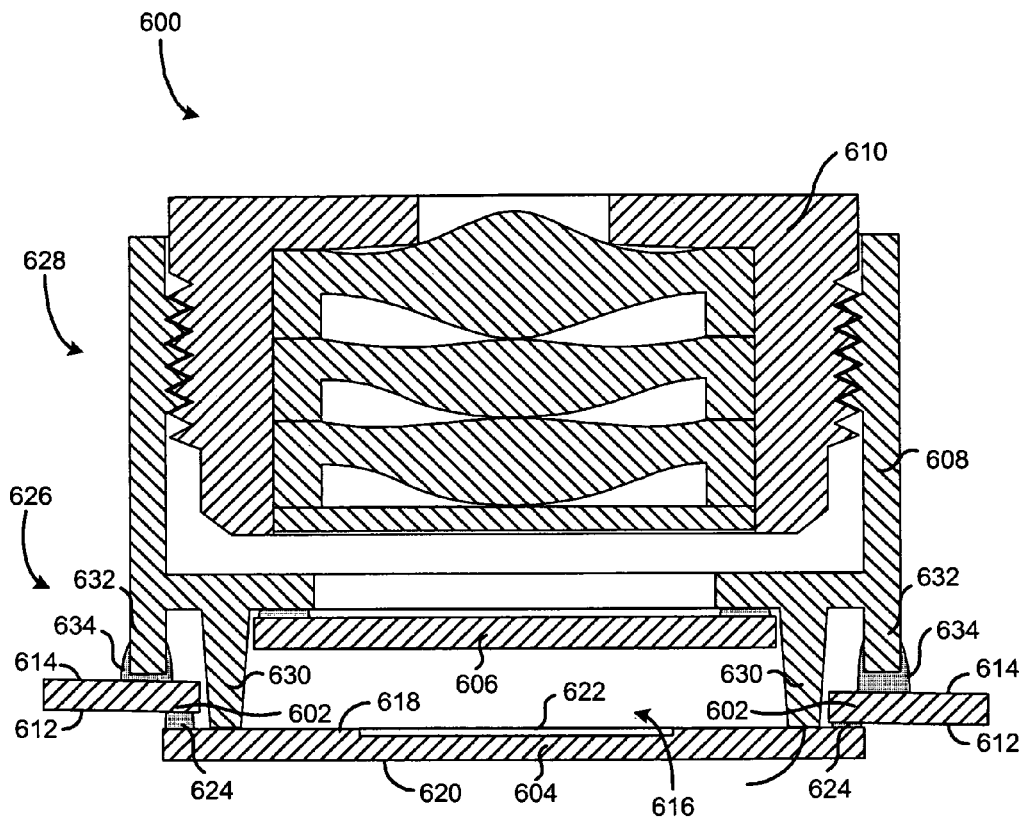
FIG. 6 is a cross sectional view of another alternate camera module according to yet another embodiment of the present invention.

FIG. 6 is a cross-sectional side view of a camera module 600, according to yet another aspect of the present invention. Camera module 600 includes a circuit substrate 602, an ICD 604, an IR filter 606, a housing 608, and a lens unit 610. Apart from the slight differences described below, the components of camera module 600 are substantially similar to the respective components of camera module 100.

In the present embodiment, camera module 600 differs from camera module 100 in that ICD 604 is flip-chip mounted to circuit substrate 602 in contrast to ICD 110 being mounted on top surface 204 of circuit substrate 108.

Circuit substrate 602 includes a bottom surface 612, a top surface 614, and an opening 616 passing therethrough. Bottom surface 612 includes a set of electrical contacts (not shown) formed around opening 616 for establishing an electrical connection with ICD 604. Top surface 614 provides a surface upon which housing 608 is affixed during assembly. Opening 616 provides an optical path between ICD 604 and lens unit 610. Further, opening 616 enables housing 608 to directly contact ICD 604 to facilitate direct tilt alignment. Although not shown, circuit substrate 602 would also include a set of electrical contacts for connecting camera module 600 to the circuitry of a host device. These contacts could be formed on either bottom surface 612 or top surface 614.

ICD 604 includes a top surface 618 and a bottom surface 620. Top surface 618 includes an image sensor array 622 and a plurality of electrical contacts (not shown) formed thereon. The contacts formed on top surface 618 are electrically connected to the contacts formed on bottom surface 612 of circuit substrate 602 via a set of conductive elements 624, which could be of any suitable known type such as, for example, gold stud bumps, solder balls, etc.

Housing 608 includes an image capture device receiving portion 626 and a lens unit receiving portion 628. ICD receiving portion 626 includes a set of three support members 630 and a sidewall 632 that are very similar to support members 302 and sidewall 304 of ICD receiving portion 212, respectively. One difference, however, is that the relative heights of support members 630 and sidewall 632 are modified to accommodate for ICD 604 being flip-chip mounted to circuit substrate 602. Accordingly, when housing 608 is positioned with respect to ICD 604, support members 630 abut top surface 618 such that sidewall 632 is suspended above top surface 614 of circuit substrate 602. Housing 608 is bonded to circuit substrate 602 via an adhesive 634 dispose between sidewall 632 and top surface 614.

Conductive elements 624 are shown to be different sizes. Indeed, the size difference between conductive elements 624 are greatly exaggerated in FIG. 6 to illustrate the benefit of the present invention. In particular, even though circuit substrate 602 is tilted with respect to both ICD 604 and housing 608, proper tilt alignment is maintained between ICD 604 and lens unit 610.

IR filter 606, lens unit 610, and lens unit receiving portion 628 are substantially similar to IR filter 112, lens unit 116, and lens unit receiving portion 214, respectively. Therefore, a detailed description of IR filter 606, lens unit 610, and lens unit receiving portion 628 are omitted to avoid redundancy.

Figure 7:
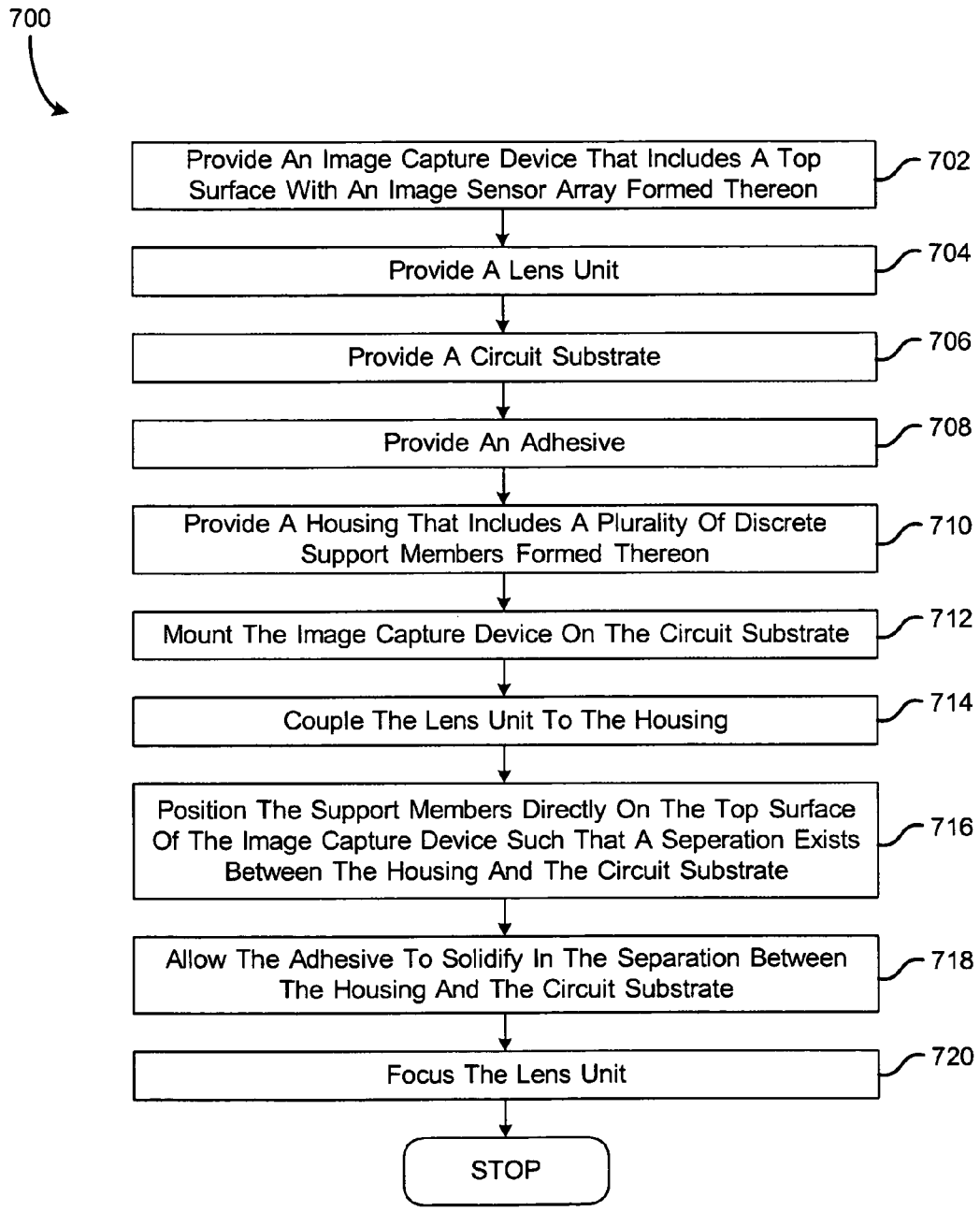
FIG. 7 is a flow chart summarizing one method of manufacturing the camera module of FIG. 1.

FIG. 7 is a flow chart summarizing one method 700 for manufacturing a camera module according to one embodiment of the present invention. In a first step 702, an image capture device is provided. The image capture device includes a top surface having an image sensor array formed thereon. Then, in a second step 704, a lens unit is provided. Next, in a third step 706, a circuit substrate is provided. Then, in a fourth step 708, and adhesive is provided. Next, in a fifth step 710, a housing that includes a plurality of discrete support members is provided. Then, in a sixth step 712, the image capture device is mounted on the circuit substrate. Next, in a seventh step 714, the lens unit is coupled to the housing. Then, in an eighth step 716, the support members of the housing are positioned in direct contact with the top surface of the image capture device such that a separation exists between the housing and the circuit substrate. Next, in a ninth step 718, the adhesive is allowed to solidify in the separation between the housing and the circuit substrate. Finally, in a tenth step 720, the lens unit is focused with respect to the image sensor array.

Method 700 can be modified to manufacture camera modules similar to camera module 500 of FIG. 5. For example, because there is no circuit substrate interposed between ICD 502 and housing 506, third step 706 and sixth step 712 are unnecessary. In addition, in eighth step 716, the separation exists between the housing 506 and the top surface 510 of ICD 502. Therefore, in ninth step 718, the adhesive is solidified between the housing 506 and the top surface 510 of ICD 502, thereby fixing housing 506 directly to ICD 502.

The description of particular embodiments of the present invention is now complete. Many of the described features may be substituted, altered or omitted without departing from the scope of the invention. For example, alternate lens and focus systems (e.g., Extended Depth Of Field) may be used to facilitate factory focus and/or user focus. As another example, the IR filter can be incorporated into the lens assembly and, therefore, the IR filter retaining features can be omitted. These and other deviations from the particular embodiments shown will be apparent to those skilled in the art, particularly in view of the foregoing disclosure.

We claim:

1. A camera module comprising:
   a housing including an image capture device receiving portion and a lens unit receiving portion, said image capture device receiving portion including a plurality of discrete support members, each of said plurality of said discrete support members having a bottom surface;
   a lens unit coupled to said lens unit receiving portion of said housing; and
   an image capture device including a single flat top surface and a bottom surface, said single flat top surface including an image sensor array, said single flat top surface of said image capture device contacting said bottom surfaces of said discrete support members, wherein said image capture device receiving portion of said housing further includes a side wall, said side wall including a bottom surface, said bottom surface of said side wall and said single flat top surface of said image capture device define a gap between said bottom surface of said side wall and said single flat top surface of said image capture device, and further comprising an adhesive disposed in said gap, said adhesive fixing said bottom surface of said side wall to said single flat top surface of said image capture device.

2. A camera module according to claim 1, wherein said support members are an integral part of said image capture device receiving portion of said housing.

3. A camera module according to claim 1, wherein said plurality of support members includes exactly three discrete support members.

4. A camera module according to claim 1, further comprising a focus feature for adjusting the position of said lens unit with respect to said image capture device.

5. A camera module according to claim 1, further comprising a light permissive substrate, said light permissive substrate being mounted in said image capture device receiving portion of said housing.

6. A camera module according to claim 5, wherein said image capture device receiving portion of said housing includes an inner surface, said inner surface defining a light permissive substrate retaining feature.

7. A camera module according to claim 5, wherein said light permissive substrate is retained by at least one of said plurality of support members.

8. A camera module according to claim 1, wherein said support members are poles extending perpendicularly with respect to said image sensor array.

9. A method for manufacturing a camera module, said method comprising:
providing an image capture device, said image capture device including a single flat top surface having an image sensor array formed thereon and a bottom surface opposite said single flat top surface;
providing a lens unit;
providing a housing, said housing including an image capture device receiving portion and a lens unit receiving portion, said image capture device receiving portion including a plurality of discrete support members, each of said discrete support members including a bottom surface;
fixing said bottom surfaces of said discrete support members in contact with said single flat top surface of said image capture device; and
coupling said lens unit to said lens unit receiving portion of said housing, wherein said image capture device receiving portion of said housing further includes a side wall, said side wall including a bottom surface, said bottom surface of said side wall and said single flat top surface of said image capture device define a gap between said bottom surface of said side wall and said single flat top surface of said image capture device, and further comprising an adhesive disposed in said gap, said adhesive fixing said bottom surface of said side wall to said single flat top surface of said image capture device.

10. A method for manufacturing a camera module according to claim 9, wherein said step of fixing said bottom surfaces of said discrete support members in contact with said single flat top surface of said image capture device:
providing an adhesive;
disposing said adhesive between said bottom surface of said side wall and said single flat top surface of said image capture device; and
maintaining contact between said bottom surfaces of said discrete support members and said single flat top surface of said image capture device while said adhesive hardens.

11. A method for manufacturing a camera module according to claim 10, wherein said support members are an integral part of said image capture device receiving portion of said housing.

12. A method for manufacturing a camera module according to claim 10, wherein said plurality of support members includes exactly three discrete support members.

13. A method for manufacturing a camera module according to claim 10, further comprising providing a focus feature for adjusting the position of said lens unit with respect to said image capture device.

14. A method for manufacturing a camera module according to claim 9, further comprising providing a light permissive substrate and mounting said light permissive substrate in said image capture device receiving portion of said housing.

15. A method for manufacturing a camera module according to claim 14, wherein said image capture device receiving portion of said housing includes an inner surface, said inner surface defining a light permissive substrate retaining feature.

16. A method for manufacturing a camera module according to claim 14, wherein said step of mounting said light permissive substrate in said image capture device receiving portion includes retaining said light permissive substrate with at least one of said plurality of support members.

17. A method for manufacturing a camera module according to claim 9, wherein said step of providing said housing includes forming said housing and said support members during the same process such that said support members are an integral part of said housing.

18. A method for manufacturing a camera module according to claim 9, wherein said plurality of support members includes exactly three discrete support members.

19. A camera module according to claim 9, wherein said support members are poles extending perpendicularly with respect to said image sensor array.

20. A method for manufacturing a camera module according to claim 9, further comprising providing a focus feature for adjusting the position of said lens unit with respect to said image capture device.

21. A method for manufacturing a camera module according to claim 20, wherein said step of providing a focusing feature includes forming a first set of threads on said lens unit receiving portion of said housing and forming a complementary second set threads on said lens unit.

* * * * *